United States Patent [19]

Molen et al.

[11] 4,159,030

[45] Jun. 26, 1979

[54] BEAD SEAT REMOVER TOOL FOR A SEMI-DROP SAFETY WHEEL

[76] Inventors: Orbin C. Molen, 1124 6th St.; Stephen C. Molen, 1215 East St., both of Orland, Calif. 95963

[21] Appl. No.: 863,059

[22] Filed: Dec. 21, 1977

[51] Int. Cl.² ............................................ B60C 25/08
[52] U.S. Cl. .................................................. 157/1.26
[58] Field of Search .................... 157/1.17, 1.26, 1.28, 157/1.3

[56] References Cited

U.S. PATENT DOCUMENTS

| | | | |
|---|---|---|---|
| 1,567,276 | 12/1925 | Kowalzcyk et al. | 157/1.26 |
| 2,489,088 | 11/1949 | Hewitt | 157/1.17 |
| 2,907,381 | 10/1959 | Newton et al. | 157/1.26 |
| 3,237,676 | 3/1966 | Wise | 157/1.26 |

Primary Examiner—James L. Jones, Jr.
Assistant Examiner—James G. Smith
Attorney, Agent, or Firm—Blair, Brown & Kreten

[57] ABSTRACT

Disclosed herein is a tire repairing tool used exclusively with a semi-drop type safety wheel comprising substantially a base member having an upstanding bar which traverses through an open portion of a wheel rim of the semi-drop safety type in which the bottom portion of the base is provided with a stay member to constrain the wheel rim during the tire removal operation. The upstanding bar member coacts through a hook inserted in an opening at the top most extremity thereof with this hook providing a hinged lever point to allow insertion therethrough of a chisel connected to a lever arm through a linkage system. Shims are provided between the upstanding bar of the base member and the chisel to nest against the wheel disposed on this type of wheel and constrain it from any motion during the tire working process.

8 Claims, 7 Drawing Figures

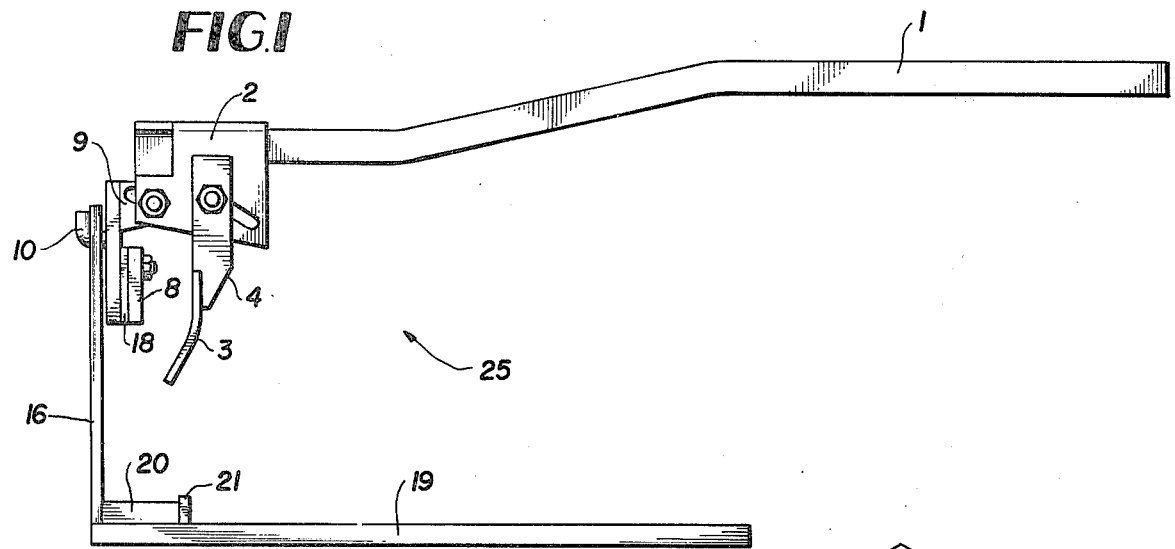
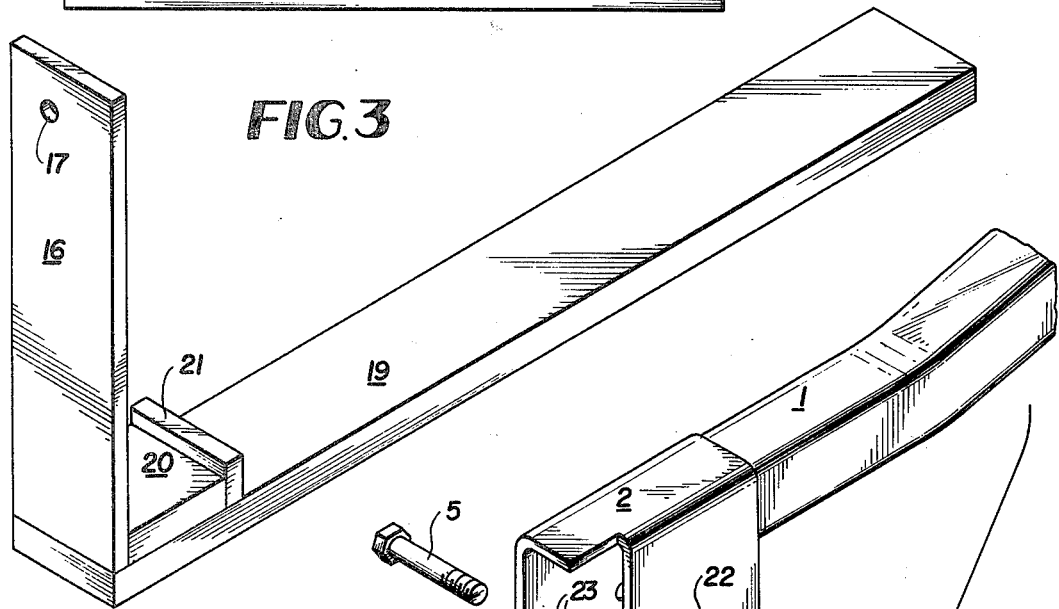
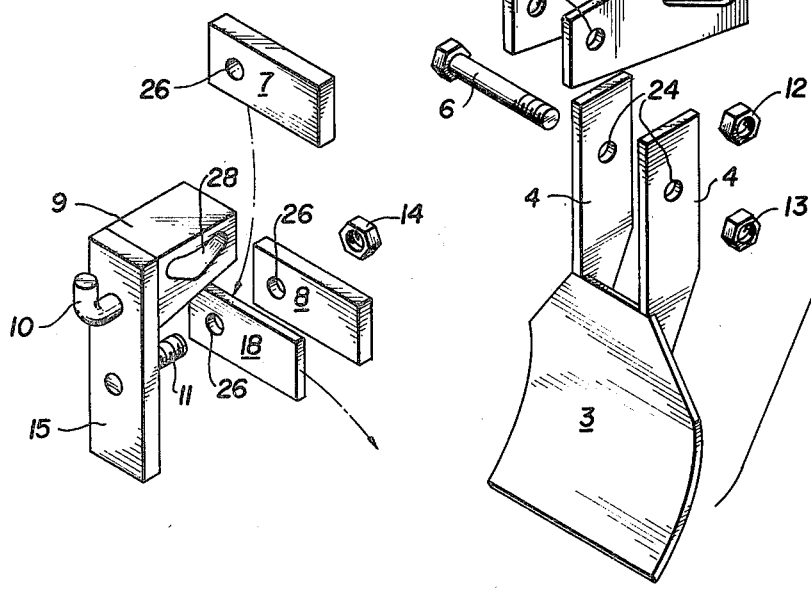

BEAD SEAT REMOVER TOOL FOR A SEMI-DROP SAFETY WHEEL

BACKGROUND OF THE INVENTION

FIELD OF THE INVENTION

The following invention relates specifically to tire working apparatus for a semi-drop safety wheel which has a lock ring disposed around the outer periphery of the front side of the rim. This type of wheel is used fairly exclusively in light and heavy-duty truck and bus applications for additional security in attaching a tire to a wheel rim since vehicles of this type carry substantive loads and therefore a fail-safe type of locking arrangement between the rim and wheel is necessary to assure that the integrity of the wheel unit will withstand various and severe types of loads during the actual use. One of the problems associated with this type of wheel however is that the locking ring which is disposed on the outer periphery of the front face of the wheel rim is difficult to remove to break down the tire for repairs.

Prior art devices of which applicant's are aware include the following U.S. Pat. Nos.

2,241,886 Pearce, et al.;
2,474,926 York.;
2,523,979 Weeks, et al.;
2,647,565 Patterson.;
2,656,882 Rodgers.;
2,667,212 Zaffina.;
2,672,184 Bergeron.;
2,760,563 Bishman.;
3,160,196 Ohlsen, et al.;
3,191,656 Edwards.;
3,237,676 Wise.

It is to be noted that none of these patents deal with or is directed to this type of a wheel although some use a support member extending through the wheel and a chisel and a lever arm; they are not capable of working on the types of wheels that the present application does.

SUMMARY OF THE INVENTION

Therefore it is to be noted that one of the primary objects of this invention is to provide a tire working tool for removing tires on rims of the semi-drop safety type having a lock ring. Further it is an object of this invention to provide a tire working tool for servicing semi-drop type safety wheels in which the maintenance of these tires can be handled in an economical and efficient manner. Another object of this invention comtemplates providing an apparatus for working on the above noted type safety wheels in which the tire working tool is easily transportable and easy to use.

These and other objects will be made manifest when considering the following detailed description and specification.

BRIEF DESCRIPTION OF THE DRAWINGS

FIG. 1 is a side view of the apparatus according to the present invention;

FIG. 2 is an exploded part view of the top portion of the apparatus;

FIG. 3 is a three quarter elevational view of the base portion of the apparatus according to the present invention;

DESCRIPTION OF THE PREFERRED EMBODIMENT

Figure 4:
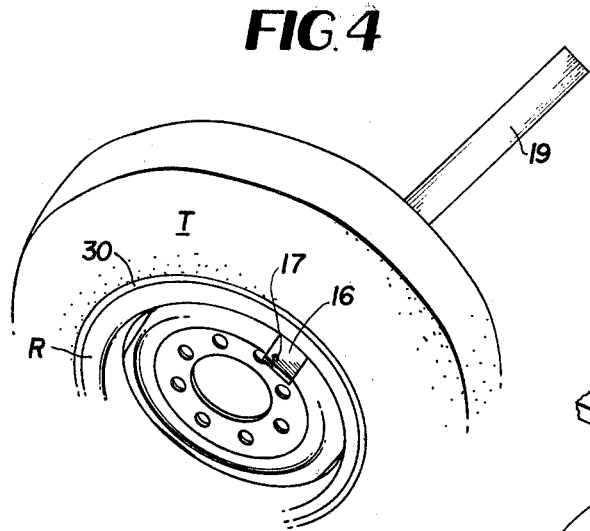
FIG. 4 is directed to the method by which the base portion is inserted into the wheel for subsequent working.

Referring to the drawings now wherein like reference numerals refer to like parts throughout, reference numeral 25 generally denotes the apparatus according to the present invention.

This tool is for use on semi-drop safety wheels, generally 16 inches. Those in use today are on Ford, Dodge, and International ¾ and 1 ton pickups, light trucks, and motor homes. The construction of this wheel differs from other semi-drop type wheels, which, when the tire is inflated, the tire bead is forced over the safety ridge to lock the tire bead in place. The problem becomes apparent when service technicians have to dismount the tire for repair or replacement. Methods used today, in most cases, cannot remove the tire bead down and over this safety-ridge. This tool is designed especially for pressing the tire bead down and over this safety ridge. This safety-ridge is built into these wheels on both front and back side. Without a means of pressing the tire bead down and over the safety-ridge the tire generally cannot be removed from the safety wheel.

FIGS. 1 through 3 show the apparatus and the following description will relate primarily thereto. Denoted therein is a base member 19 upon which a tire is to be rested and this base member is provided with a block portion 20 located at the juncture of the base 19 and the upstanding bar 16 and a block member forming a lip 21 disposed at the extremity of block 20 of the base forming an upstanding lip or rim for use on the wheel according to the present invention.

The upstanding bar 16 is inserted through the wheel opening of the semi-drop safety wheel so that its terminal portion extends above the plane of the front of the tire rim and disposed at the extremity of this bar is a hole 17 which is used to connect the top portion of this tire working tool by means of a hook 10 which provides the hinged connection between the base portion of the tire working tool and the top portion. Hook 10 is fastened to an L-shaped bracket member defined by reference numerals 9 as a horizontal leg and 15 as the vertical leg, and the horizontal leg 9 is provided with a slot 28 extending therethrough for fastening to a U-shaped collar 2 which will be described hereinafter. The vertical leg 15 of the L-shaped bracket has disposed in the horizontal plane and below the block 9 a threaded stud whose purpose is to provide a support for a plurality of shims denoted by numerals 7, 8 and 18. These shims are all provided with holes 26 to be slidably disposed on the stud 11 and are fastened thereto by means of nut 14. The width of the shims vary so that flexibility is provided in providing one tool for servicing many different size wheels. The purpose of these shims will be explained hereinafter. Housing 2 is connected to the horizontal leg 9 by means of bolts 5 which traverse through slot way 28 and is anchored to the housing through holes 23 and nut 12. The housing 2 extends rearwardly to a long handle 1 which provides leverage in providing a downward motion of the tire working tool as will shortly be explained. The housing 2 also provides the support for the chisel 3 which coacts against the bead of the tire pushing it downwardly and allowing the tire to be worked on. The chisel 3 is generally of curved shape and a shovel like configuration having two upwardly extending tangs 4 provided with holes 24 which communicate with slot 22 on the housing 2 and is connected thereto by means of bolts 6 and nut 13.

Figure 5:
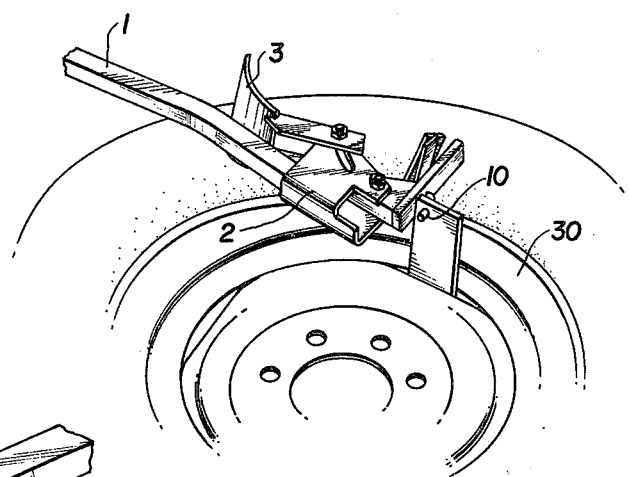
FIG. 5 shows the second step involved in the method of working on a tire with the apparatus according to the present invention.
Figure 6:
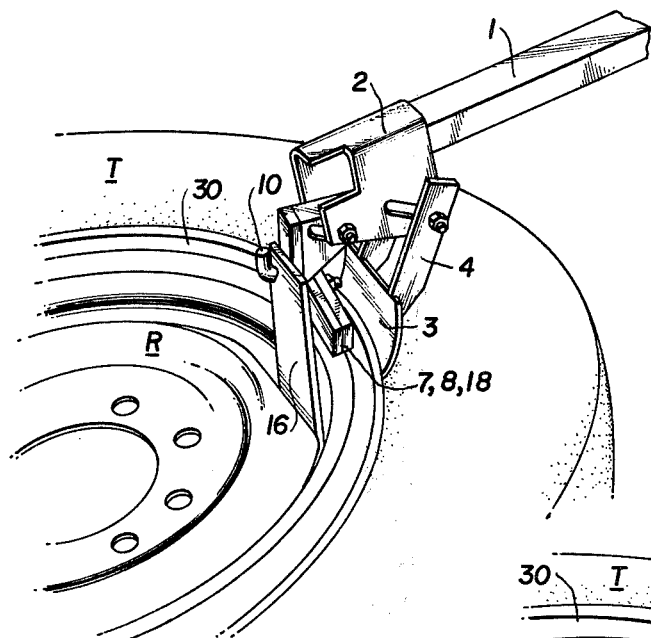
FIG. 6 shows the third step involved in working on a tire according to the apparatus of the present invention.
Figure 7:
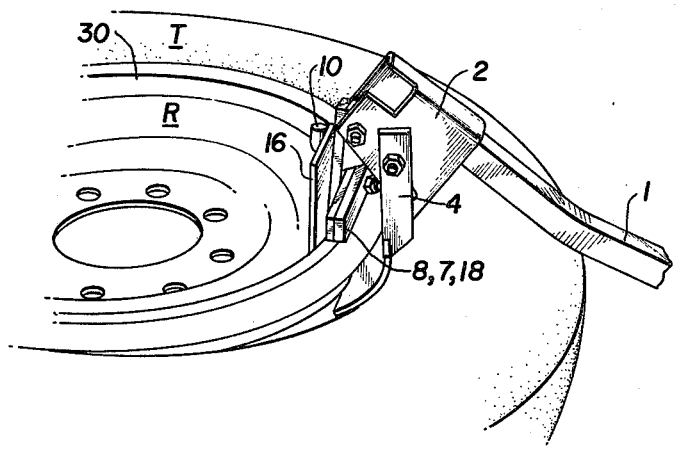
FIG. 7 shows the forth step involved in working on a tire according to the apparatus of the present invention.

FIGS. 4 through 7 graphically depict the manner in which this apparatus thus having been described works on a wheel known as the semi-drop safety wheel. It is to be noted that the wheel rim R has surrounding it a tire T and in between the rim and the tire T is a ring 30 defined as a locking ring. The locking ring 30 is that which causes the bead of the tire to remain on the rim R and is therefore quite important to assuring that a truck or heavy-duty bus will be able to take the severe loads imposed upon them. In operation therefore the base elements 19 and 16 are inserted through the slot of a wheel and the tire is then laid on its bottom side so that the terminal portion 16 is upwardly extending and the base member 19 is laying on the floor and the block members 20 and 21 provide a nesting constraint to retard slippage of the tire and rim assembly on the ground. The hole 17 provided in upstanding bar 16 provides the hinge point to which hook member 10 is inserted and as shown in FIG. 5 the hook is inserted when the top portion of the tire working tool is substantially coplanar with the plane defined by the locking ring 30. Towards this end, it is to be noted that hole 17 is offset relative to a center line of upstanding bar 16 and it will be apparent when viewed in FIG. 6 why this is necessary. FIG. 6 shows the tire working tool, its upper portion thereof rotated 90 degrees to provide the locking and leverage required for further tire working. When the tire is in this state, it is of course removed of all air and the shims 7, 8, and 18 depending upon the magnitude (i.e., the distance from the slot to the rim edge) of the wheel are caused to ride between the leg 15 and wheel rim base and be constrained thereagainst. Pushing outwardly and downwardly on the lever arm handle 1 causes the chisel element 3 to contact the tire substantially at the point of tangency between the lock ring and the tire. Since the chisel 3 is concave relative to the center of the wheel and its sides are substantially linear until the top portion tapers inward to meet the tangs 4, force on the handle causes bolt 6 to slide forward in slot 22 to remove the tire bead over the safety ridge. A further downward force as shown in FIG. 7 causes the tire to be depressed and removed downwardly from the rim and the lock ring over the safety ridge (not shown). Therefore, the shims are made of different dimensions to accommodate wheels of different distance between the slot and the rim edge. For example, on a single type semi-drop safety wheel, shims are not required on the side having the lock ring, but only one shim is required on the back side of the wheel. On dual wheels, shims are required on both the front and back sides since both sides of the tire must be broken off the rim.

Accordingly, in view of the foregoing it will be appreciated that none of the prior art devices which applicant is aware of provides these features and accordingly it is submitted that the benefits derived from the unique construction of this apparatus differentiates itself from all of the prior art even though they all use the principal of leverage for tire working.

Having thus described the preferred embodiment of the invention it should be understood that numerous structural modifications and adaptations may be resorted to without departing from the spirit of the invention.

What is claimed is:

1. A tire working tool for use on a semi-drop type safety wheel which is provided with a locking ring thereon comprising in combination:
    a base member having an attached upstanding bar provided with a hole at an extremity of said upstanding bar remote from said base,
    handle means attached to said upstanding bar at said hole,
    and chisel means connected to said handle means, the connection defined by a downwardly extending U-shaped collar connected to a handle so that said collar supports both said handle on said upstanding bar and said chisel means, an elongate slot disposed on opposed faces of said U-shaped collar, upwardly extending facing tangs supporting said chisel having holes thereon oriented to register with said slots on said collar, and bolt means for fastening said chisel in said slot,
    whereby action on the handle to break down a tire causes the tangs of the chisel in the slot to be closest to the upstanding bar to force the tire bead off of the rim, and succeeding downward action on the handle causes the tangs to ride back in the slot away from the upstanding bar, thereby reorienting the chisel and forcing the tire down away from the rim.

2. The device of claim 1 wherein said base member is provided with at least one block means formed to engage the rim of the tire remote from the side to be worked on.

3. The apparatus of claim 2 wherein a plurality of shims which can be removed and replaced with other shims having different dimensions to accommodate wheels of different dimensions is disposed on said handle means between said upstanding bar and said chisel means and rests on the face of the tire being broken down to provide support and stability for the tire working tool.

4. The apparatus of claim 3 wherein said handle means includes an L-shaped bracket having a vertical leg upon which said shims are disposed and a horizontal leg upon which said U-shaped collar is disposed, said U-shaped collar providing a connection between said L-shaped bracket and the handle, and said horizontal leg has a V-shaped slot connecting the U-shaped collar with a bolt so that said handle means can shift laterally in said V slot to accommodate different size wheels.

5. The apparatus of claim 4 in which said chisel curves concave towards the center of the wheel, said chisel having a substantially linear bottom portion, planar side portions at its lower extent, and an inwardly tapering medial side portions where said chisel meets said tangs.

6. The device of claim 5 in which said handle means is connected to said upstanding bar by a hook on said handle means which goes through said hole.

7. The device of claim 6 in which the hole is axially offset on said upstanding bar.

8. The device of claim 7 in which a second block means is contiguous with the first block means, forms a lip between said two block means, and both are placed at the connection between said upstanding bar and base member with the first block means interposed between the upstanding bar and second block means.

* * * * *